United States Patent Office 2,817,548
Patented Dec. 24, 1957

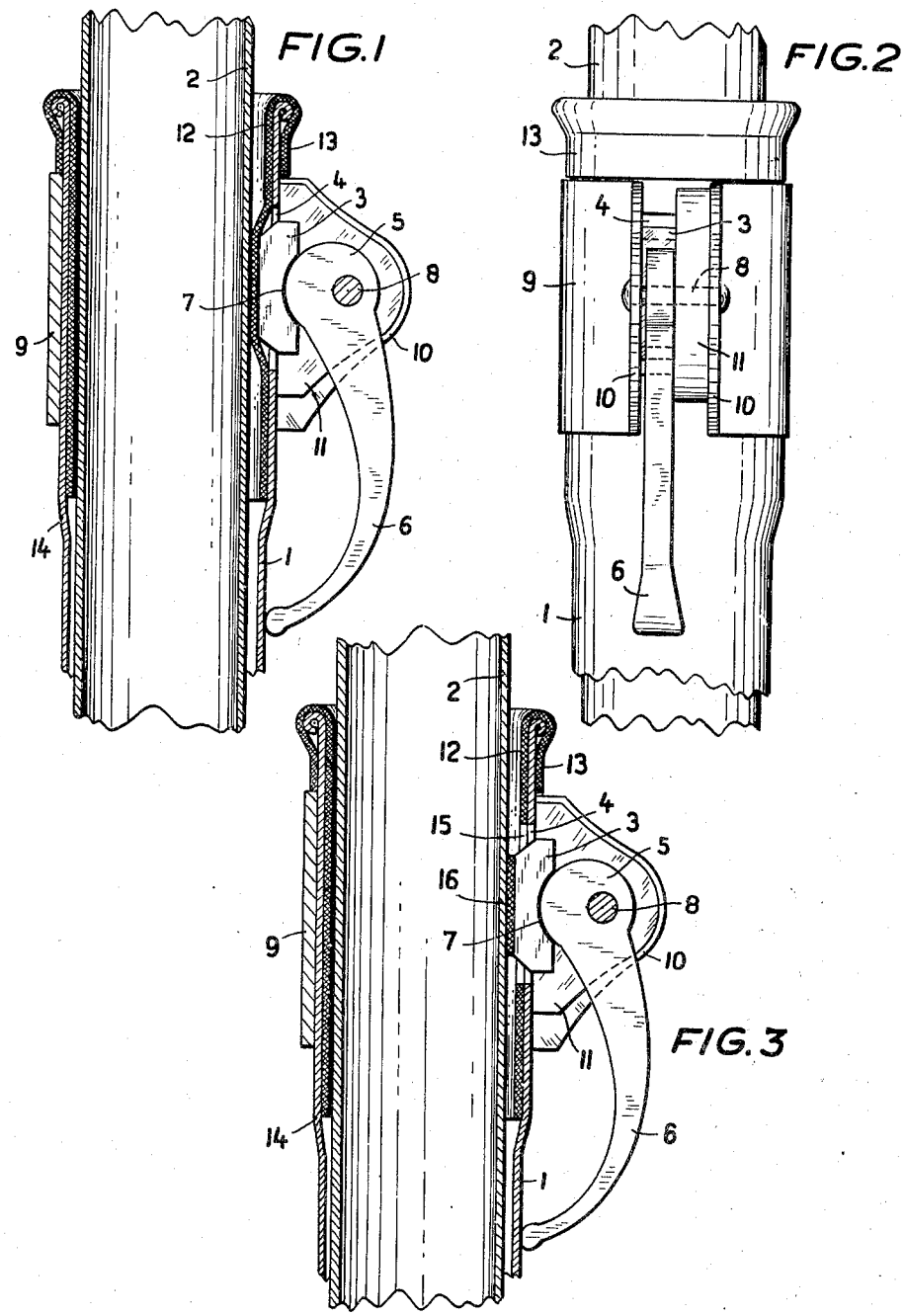

2,817,548

CLAMPING DEVICE FOR GARDEN SUNSHADES

Wolfgang Uthemann, Leichlingen, Rhineland, Germany, assignor to Rosenkaimer G. m. b. H., Leichlingen, Germany Application October 14, 1955, Serial No. 540,575

Claims priority, application Germany October 15, 1954

3 Claims. (Cl. 287—58)

This invention relates to a clamping device for garden sunshades, especially a clamping connection for telescopically movable tubular members.

The various clamping devices for garden sunshades designed for providing a clamping connection between the lower and upper tubular members of the sunshade pole, have the drawback that metal parts are pressed one upon another and in course of time damage to the lacquer finish results.

The foregoing drawback is obviated by the present invention, the principal object of which is to provide a resilient flexible intermediate member between the tubular telescoping members which allows resilient pressing of the clamping device without damage to the lacquer finish of the tubular members and the intermediate member preferably consists of a collar applied to one of the tubular members on one of the opposed faces thereof.

It is a further object of the invention to provide such an intermediate member in the form of a collar on the inner face of the outer tubular member to be pressed toward the inner tubular member.

It is a further object of the invention to provide a clamping member for telescoping tubular members of a sunshade whereby a cushioned or resilient member is attached to that part of a clamp engaged with one of the tubular members.

In the drawing are illustrated by way of example two embodiments of the clamping device according to the invention.

Fig. 1 shows one embodiment of the device in longitudinal section,

Fig. 2 is a side view of the device, and

Fig. 3 shows a modified embodiment of the device.

In the embodiment illustrated in Figs. 1 and 2 of the drawing, the garden sunshade includes two telescopically movable tubular members, namely, an outer tubular member 1 and an inner tubular member 2. Clamping connection between the tubular members 1 and 2 may be effected by means of a freely movable clamping member 3 which extends in radial direction through an opening 4 in the outer tubular member 1. The clamping member 3 is held in position by means of the eccentric head 5 of operating lever 6, the head 5 engaging a corresponding recess 7 at the outer surface of clamping member 3. The head 5 of operating lever 6 is pivoted by means of a shaft 8 between the spaced parallel lateral projections 10 of a clamping sleeve 9 which surrounds the outer tubular member 1. Movement of freely movable clamping member 3 in radial direction is guided by means of a spacer plate 11 mounted upon shaft 8 between the eccentric head 5 of operating lever 6 and one lateral projection 10 of the clamping sleeve 9.

For the purpose of improving the clamping effect and for removal of the drawbacks caused by damaging or scratching of the tubular member to be clamped, a resilient flexible intermediate layer, preferably in the form of a collar 12, is provided according to the invention between the tubular members as, for example, at the inner face of the outer tubular member 1. The upper edge of collar 12 may be bent around the upper edge of the tubular member 1 at 13 to prevent sliding in axial direction. The upper edge of collar 12 bent around the upper edge of the tubular member 1 may also be put beneath the clamping sleeve 9 to be fixed thereby. The collar 12 may be made from any suitable material, as for example, plastics, rubber, leather or the like.

The diameter of the tubular member carrying the collar is suitably dimensioned in such a manner that the inner or outer diameter of the collar corresponds to the diameter of that part of the tubular member which is not covered by the collar. As shown in Fig. 1, the outer tubular member 1 may be enlarged at 14 so that the inner diameter of collar 12 is equal to the inner diameter of the lower part of outer tubular member 1.

If operating lever 6 is moved downwards into the position shown in Fig. 1, the eccentric head 5 of lever 6 moves the freely movable clamping member 3 in radial direction whereby the flexible collar 12 is lifted from the inner face of outer tubular member 1 and is brought into clamping engagement with the inner tubular member 2.

In the modified embodiment of the clamping device according to the invention illustrated in Fig. 3, the flexible collar 12 is provided with an opening 15 registering with the opening 4 of the outer tubular member 1. The freely movable clamping member 3 extends in radial direction through the openings 4 and 15 and its inner surface is provided with a resilient layer 16. Upon downward movement of the operating lever 6, this resilient layer 16 of the clamping member 3 is brought into clamping engagement with the inner tubular member 2, while diametrically opposite this clamping place the clamping sleeve 9 presses collar 12 towards the inner tubular member 2.

While there are herein shown and described the preferred embodiments of the invention, it is nevertheless to be understood that minor changes may be made therein without departing from the spirit and scope of the invention as claimed.

What is claimed is:

1. A clamping device for garden sunshades wherein telescoping tubular members constitute a shade support, a clamp for holding the tubular members in adjusted position, said clamp comprising a sleeve surrounding the upper end of the outer tubular member, a clamping lever pivotally supported in the sleeve, a flexible tubular collar interposed between the upper end of the outer tubular member and the inner tubular member, and completely surrounding the latter in the clamping zone, the upper end of the outer tubular member being enlarged in diameter in an amount substantially equalling the thickness of said tubular collar and surrounding said collar, the collar at its upper end being turned outwardly and downwardly over the upper end of the outer tubular member to find support thereon, the outer tubular member having an opening therein facing said collar and a freely mounted clamping block engaged by the lever for movement through the opening for moving the clamping block and flexible tubular collar into clamping engagement with the inner tubular member.

2. A clamping device for garden sunshades as in claim 1, wherein the flexible tubular collar is formed of rubber.

3. A clamping device for garden sunshades as in claim 1, wherein the flexible tubular collar is formed of leather.

References Cited in the file of this patent

UNITED STATES PATENTS

| | | |
|---|---|---|
| 625,020 | Chappuis | May 16, 1899 |
| 695,528 | Beckley | Mar. 18, 1902 |
| 697,146 | Howard | Apr. 8, 1902 |
| 2,503,738 | Horton | Apr. 11, 1950 |

FOREIGN PATENTS

| | | |
|---|---|---|
| 702,271 | Great Britain | Jan. 13, 1954 |